United States Patent [19]

Lunzer et al.

[11] Patent Number: 5,099,687
[45] Date of Patent: Mar. 31, 1992

[54] ELECTRICALLY NEUTRAL FLOW MEASUREMENT SYSTEM

[75] Inventors: Lawrence J. Lunzer, St. Louis Park; Anthony G. Brajdich, Ham Lake, both of Minn.

[73] Assignee: Graco Inc., Minneapolis, Minn.

[21] Appl. No.: 632,317

[22] Filed: Dec. 21, 1990

[51] Int. Cl.$^5$ .............................. G01F 15/00
[52] U.S. Cl. .................... 73/198; 73/272 A; 73/861.77
[58] Field of Search ............ 73/861.77, 198, 272 A

[56] References Cited

U.S. PATENT DOCUMENTS 4,140,013  2/1979  Hunger .................. 73/861.77
4,936,151  6/1990  Tokio ..................... 73/861.77

Primary Examiner—Herbert Goldstein
Attorney, Agent, or Firm—Palmatier & Sjoquist

[57] ABSTRACT

An electrical isolation system for monitoring liquid flow rate from pumping equipment housed within a confined enclosure, wherein the flow rate signals are developed into optical signals which are conveyed via fiber optic cables from within the enclosure to control modules outside the enclosure. The control for operating the system may thereby be wholly electrically isolated from the pumping equipment.

9 Claims, 3 Drawing Sheets

ELECTRICALLY NEUTRAL FLOW MEASUREMENT SYSTEM

BACKGROUND OF THE INVENTION

The present invention relates to liquid flow measurement systems; more particularly, the invention relates to a flow measurement system for use in hazardous environments, to isolate electrical measurement components from volatile liquids and vapors.

There is an increasing need in industrial applications for maintaining a strict measurement and control over the use of volatile liquid substances, e.g., paint, cleaning solvents, and multiple-component coating materials. The increasing costs of these materials is one factor which dictates strict measurement and control, but the increasing pressures for environmental protection is an equally strong factor. Wherever coating materials are used in industry there is a strong cost consideration for monitoring material flow and coating thicknesses, and for measuring the flow volume of such materials in the distribution system within an industrial plant. Environmental and safety considerations frequently require that coating materials be collected into an environmentally secure space, and that they be distributed from this location into the various coating application positions which exist in the plant facility. It is not unusual for coating materials to be shipped to industrial plant facilities in large barrels or drums, for delivery into a single sealed room within the facility, and then to be pumped through specialized plumbing arrangements to the distribution points within the plant. Since these materials are associated with volatile solvents and vapors, it is important that the distribution room be kept free from electrical equipment of all types, to reduce the likelihood of spark generation which might ignite the materials. As a result, the pumping equipment which is utilized for distributing these materials is frequently air-driven equipment, and the electrical compressors and other electrical equipment which provides the power for this machinery is physically separated from the distribution room to the extent such separation is practical.

In recent years, plural component coating systems have become popular, because the quality of the coating finish leads to improved product value. In a plural component system a base material and a catalyst material are initially separately contained, and the materials are mixed at the time of application to create a coating material which becomes activated and stabilized upon exposure to air. In such systems, it is important that the mixing be accomplished either close to the point of application, or if mixed in the distribution room, that the materials be isolated from exposure to air. The metering of the flow rates of these materials must be carefully monitored, so as to enable a precise proportioning of the respective materials.

There is therefore a need for a flow rate metering system which is safe in a hazardous area and which thereby eliminates the need for placement of electrical components in the vicinity of volatile environments. There is also a need for a flow rate metering system which may be positioned in a voltatile environment, but which may be remotely controlled and activated for the protection of operating personnel. There is also a need for a flow rate measuring system which is capable of satisfactory operation over a wide range of temperatures, and in atmospheres which may be hostile to human accessibility.

SUMMARY OF THE INVENTION

A flow measurement device which may be inserted into a material flow line in a hostile environment, which includes electrical sensors for monitoring rotating component metering devices, and fiber optic components for transmitting and receiving signals relative to the metering operation. The metering and sensing electronics are confined within an enclosed housing, and electrical power for operating the components is derived from an alternator which is coupled to a mechanical air-driven turbine, all confined within the same housing. The turbine is powered by pressurized air which may be delivered into the housing via hoses coupled to remotely positioned compressed air supplies.

It is the principal object of the present invention to provide a safe flow metering system which may be utilized in hostile and hazardous environments.

It is another object of the present invention to provide electronic circuits and sensors for monitoring flow rate, wherein electrical power for driving the electronic components is derived from an air-driven turbine, wherein all electrical components are confined within a safe housing.

It is another object of the present invention to provide a flow metering system which is safe, and which may be remotely controlled and monitored.

The foregoing and other objects and advantages of the invention will become apparent from the appended specification and claims, and with reference to the drawings.

DESCRIPTION OF THE PREFERRED EMBODIMENT

Figure 1:
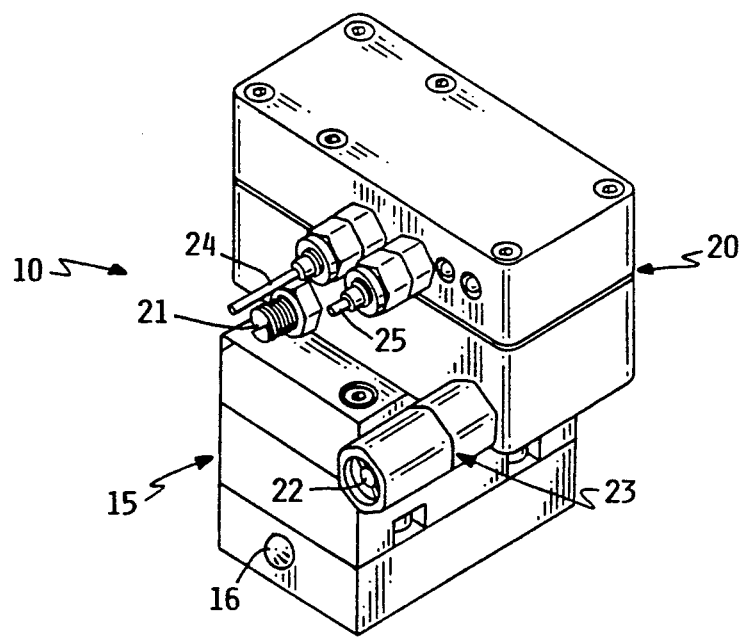
FIG. 1 shows an isometric view of the invention.

Referring first to FIG. 1, an isometric view of flow meter 10 of the present invention is shown. Flow meter 10 includes a liquid flow counter 15, attached to a transmitter 20. Flow counter 15 has a liquid inlet 16 and outlet 17, adapted for insertion into a liquid flow line. Transmitter 20 has an air inlet port 21 and an air exhaust port 22. Exhaust port 22 is coupled to transmitter 20 via an adjustable flow valve 23. Air inlet port 21 is coupled to a compressed air line 26 (see FIG. 2), which in turn is coupled to a source of compressed air. A pair of fiber optic cables 24, 25 are attached to transmitter 20, for purposes to be hereinafter described.

Figure 2:
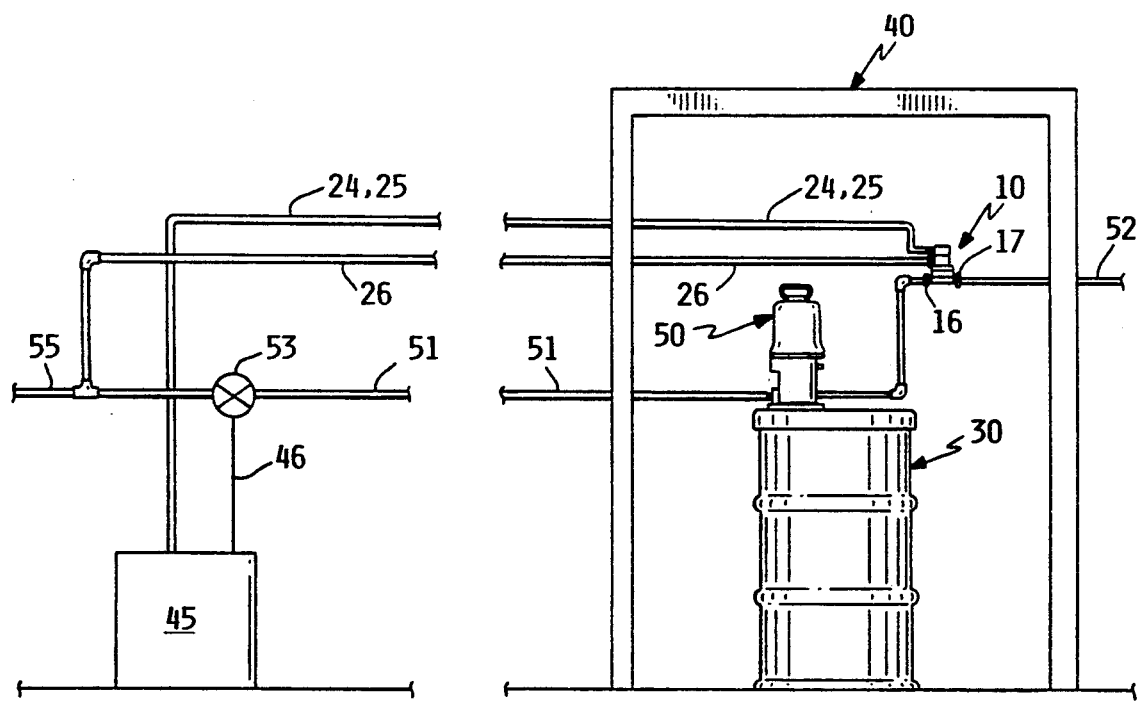
FIG. 2 shows a diagram of one form of using the invention.

FIG. 2 shows a typical operational environment for using the invention. A container 30 for paint or other flammable material is stored within an enclosed room or enclosure 40, to prevent the escape of solvents and other flammable materials from the area. A liquid pump 50 is inserted into container 30 for pumping the liquid through a liquid delivery line 52, which passes through enclosure 40. Delivery line 52 transfers the pumped liquid to any of a number of destinations within the industrial plant. Pump 50 is preferably driven by a source of compressed air via air lines 51, and air line 51 passes through enclosure 40 to a source of compressed air. A controllable air valve 53 is inserted into air line 51 to control the volume flow rate of air which is sent to pump 50 via an air delivery line 55. Of course, all of the air lines described in connection with this invention may have suitable regulators and flow control valves associated therewith, to ensure proper flow control from a compressed air source. Air is delivered to the system via an air delivery line 55. Compressed air line 26 is also connected to delivery line 55.

The liquid passing through delivery line 52 also passes through flow meter 10, which is connected into delivery line 52. Flow meter 10 has a pair of fiber optic cables 24, 25 which pass through enclosure 40 to an exterior control module 45. Control module 45 is placed at a location which is external to enclosure 40 for safety reasons; control module 45 receives the fiber optic signals conveyed by fiber optic cables 24, 25, and generates a control signal over line 46 to control valve 53, for purposes of adjustably controlling the air pressure to pump 50. Control over the air pressure thereby controls the pumping pressure of pump 50, and controls the liquid delivery pressure and flow rate for liquid delivered through delivery line 52. Flow meter 10 also has an air inlet line 26 which is connected to air delivery line 55, for providing a source of compressed air to flow meter 10. It is to be noted that the only lines which pass from the inside of enclosure 40 to the outside of enclosure 40 are air lines 26, 51, liquid delivery line 52, and fiber optic cables 24, 25. There are no electrical wire connections passing through enclosure 40.

Figure 3:
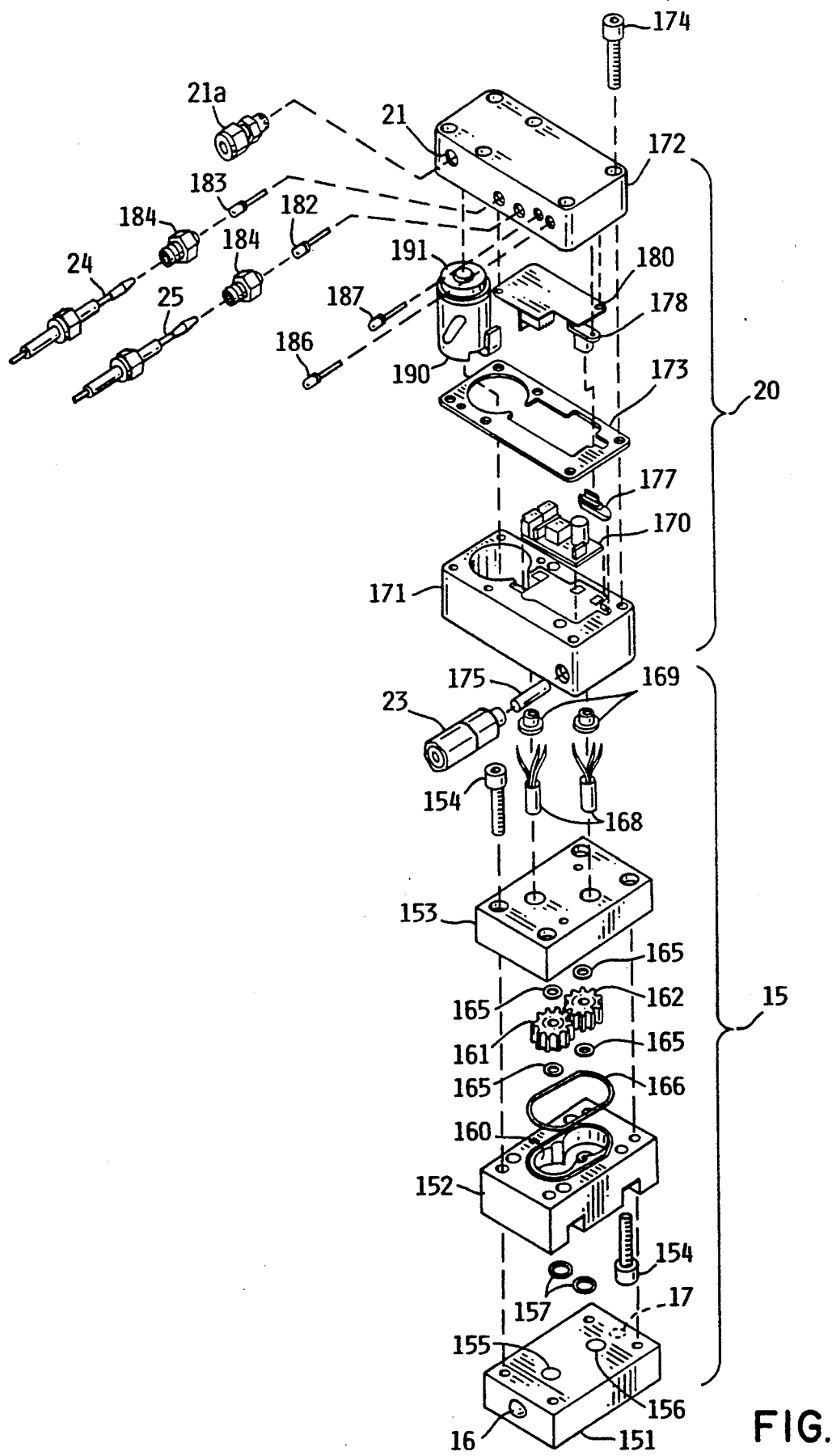
FIG. 3 shows an exploded isometric view of the invention.

Referring next to FIG. 3, flow meter 10 of the present invention is shown in exploded view. Liquid flow counter 15 is a commercially available part, manufactured by Dopag Company of Mechanicville, N.Y.; the model preferable for use with the present invention is sold under Dopag Part No. 480.04.00. Liquid flow counter 15 includes a liquid connector block 151, a gear housing 152, and a sensor housing 153, all of which are held together in sealable relationship by fasteners 154 or the like. Liquid connector block 151 has a liquid inlet port 16 which is connected via passages to feed port 155; and a liquid outlet port 17 which is connected via passages to feed port 156. Feed port 155, 156 are sealably connected to corresponding ports in gear housing 152, wherein the liquid seal connection is ensured by 0-rings 157.

Gear housing 152 has an internal chamber 160 into which are fitted two engageable gears 161 and 162. Gears 161, 162 are freely rotatable within chamber 160, and are supported by gear spacers 165. A gasket 166 sealably connects gear housing 152 to sensor housing 153. Sensor housing 153 holds a pair of hall effect sensors 168 in close proximity to gears 161, 162. Hall effect sensors 168 are electrically connected to a circuit board 170, which is housed within transmitter module 20. A pair of bushings 169 fixedly hold hall effect sensors 168 in sensor housing 153.

Transmitter 20 has a lower chassis 171 and a top chassis 172. An intermediate gasket 173 is positioned between the chassis 171 and 172, and the two chassis members are affixed together by means of fasteners 174, only one of which is shown in FIG. 3. Flow valve 23 is threadably inserted into lower chassis 171, with an intermediate flame arrester 175. A circuit board 170 is recessed within lower chassis 171, and is electrically connected to Hall effect sensors 168. Circuit board 170 contains the electronic circuitry for converting signals from the Hall effect sensors 168 into electrical signals which are coupled to transmitter circuit board 180 via connectors 177, 178. Transmitter circuit board 180 is electrically connected to a pair of light-emitting diodes 182, 183, which are positioned proximate the ends of fiber optic cables 24, 25. Fiber optic cables 24, 25 are connected to top chassis 172 by connector fittings 184. A second pair of light-emitting diodes 186, 187 are also electrically connected to transmitter circuit board 180, and are affixed within top chassis 172. Air inlet port 21 is connected to a compressed air line 26 by means of a connector fitting 21a. An air turbine/alternator 190 is fitted into a recess in lower chassis 171, with a turbine member 191 placed in air flow communication with air inlet port 21. Air turbine/alternator 190 is a component manufactured by the assignee of the present invention, under Graco Part No. 222-319. Rotation of turbine member 191 causes an electrical voltage to be generated by air turbine/alternator 190, which voltage is connected to transmitter circuit board 180 and sensor circuit board 170. Air turbine/alternator 190 provides all of the electrical power for driving the electrical circuits to be described in connection with this invention.

Figure 4:
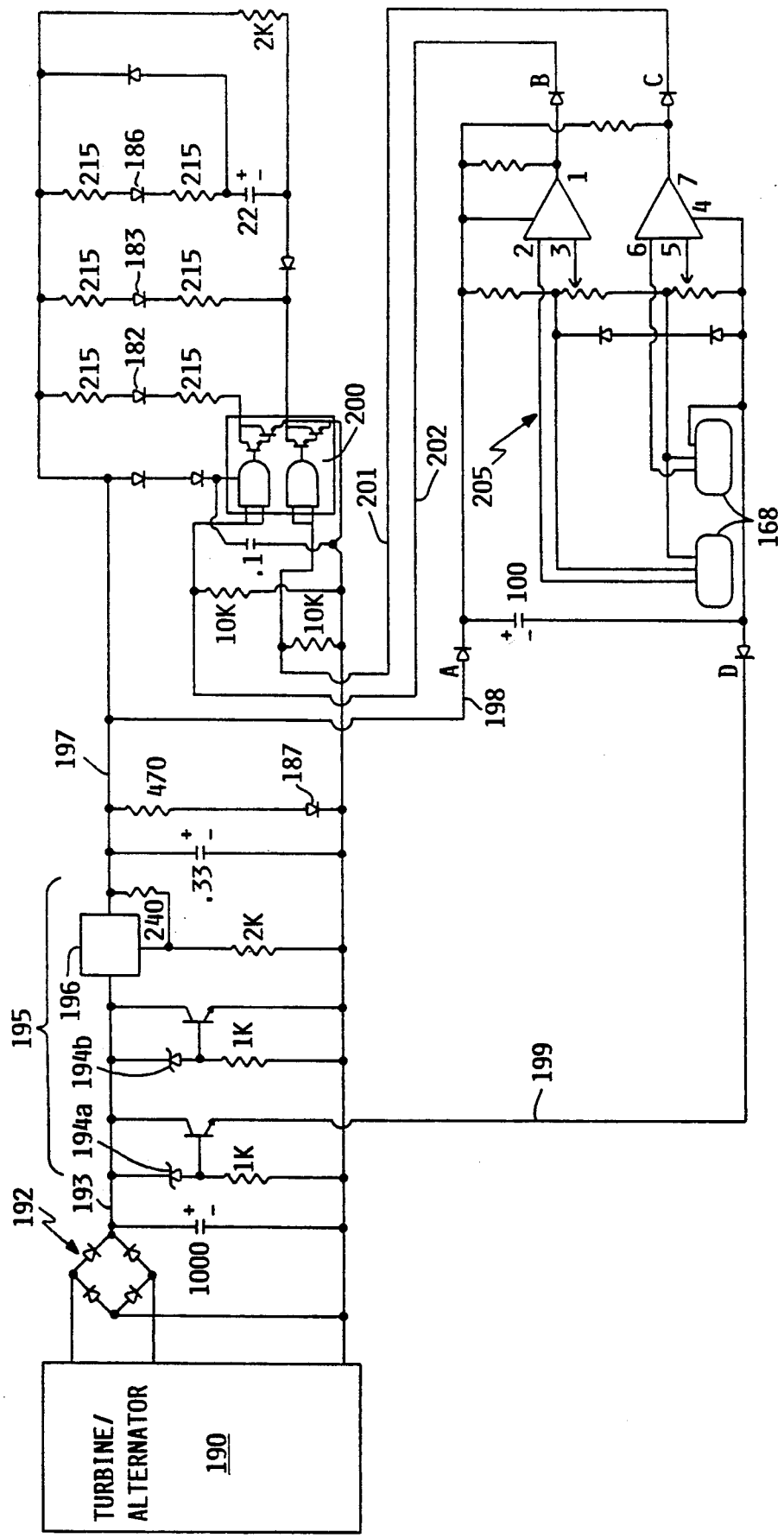
FIG. 4 shows a schematic diagram of circuits used in the invention.

Referring next to FIG. 4, an electrical schematic diagram of the electrical components associated with the present invention is shown.

Turbine/alternator 190 is connected to a full wave rectifier circuit 192, to produce an unregulated DC voltage output on line 193, of approximately 14.5 volts DC. The voltage on line 193 is fed into circuits which comprise a voltage regulator 195, to produce a regulated DC voltage on line 197 of about 11.5 volts DC. Voltage regulator 195 includes a semiconductor linear regulator 196, which is preferably a semiconductor circuit type LM317T, manufactured by National Semiconductor. The voltage on line 197 is coupled into semiconductor power driver circuit 200 via two voltage dropping diodes, to form the input voltage for operating power driver circuit 200. Power driver circuit 200 has two output voltage drive lines, one connected to light-emitting diode 182 and the other connected to light-emitting diode 183. Light-emitting diodes 182 and 183 are affixed in top chassis 172 of transmitter 20, to provide the light signals to fiber optic cables 24, 25. A third light-emitting diode 186 is also driven by power driver circuit 200, and is affixed in top chassis 172 to provide a visual indicator to the operator, to indicate that liquid is being delivered through output liquid delivery line 152. The fourth light-emitting diode 187 is connected to regulated voltage line 197, to provide a visual indicator to the operator to indicate that the turbine/alternator is operating and delivering voltage.

Sensor circuit 205 functions to provide electrical drive signals to power driver circuit 200, in response to signals generated by Hall effect sensors 168, which are designated as "sensor 1" and "sensor 2" in FIG. 4. The operator voltage for sensor circuit 205 is derived from turbine/alternator 190, by means of voltages tapped at lines 198, 199. Sensor circuit 205 is a commercially available circuit, obtainable from the manufacturer of liquid flow counter 15. Sensor circuit 205 develops a signal voltage on line 201 whenever sensor 1 becomes activated by virtue of sensing the rotational movement of one of the gears 161, 162. A signal voltage is developed on line 202 whenever sensor 2 develops a signal as a result of sensing movement of the other of gears 161, 162. The signals on lines 201, 202 therefore represent rotational drive signals from the liquid flow counter 15, indicative of rotation of gears 161, 162 and therefore indicative of liquid flow through delivery line 52. The repetitive rate of signals on lines 201, 202 represent the rate of liquid flow through line 52, and this flow rate is translated into blinking light signals from light-emitting diodes 182, 183. The blinking light signals are conveyed via the fiber optic cables 24, 25 to a remote destination, designated as control module 45 in FIG. 2, where they may be received by photo-sensitive circuits according to techniques well known in the art. The photo-sensitive receivers will convert the light signals back into electrical signals, which may be used to develop either a visual indication for an operator, or an electrical control signal to drive control valve 53 via line 46. The control circuits required for such purposes are well known in the art and are not further explained herein.

The numerical circuit values shown in FIG. 4 are intended to represent ohms, in the case of resistors, and microfarads, in the case of capacitors. The diodes which are not otherwise identified are commercially available components; zenor diode 194a is preferably a 15 volt zener diode, Type 1N5245B, and zener diode 194b is preferably a 14 volt diode, Type 1N5244B.

In operation, pressurized air is delivered via the control valve to drive the liquid pump, and as liquid is delivered via the liquid delivery line the flow rate of delivery is sensed by the liquid flow counter. The liquid flow counter translates the flow rate into electrical signals which are converted into light signals by the transmitter, and the light signals are conveyed via the fiber optical cables to a remote control module. The remote control module provides either a visual indication for operator use or a control signal for adjusting the air control valve, so that control liquid delivery can be maintained in the system. All of the electrical signals required for operating the system are developed within the enclosure, as a result of pressurized air delivered to the turbine/alternator, which is converted to suitable electrical voltages for the circuits. There is a complete electrical isolation between the external control and drive modules and the internal operating circuits, the only signals which are permitted to pass through the walls of the enclosure being either pressurized air or light signals. The system thereby may deliver liquids from an enclosed room with total electrical isolation, to eliminate any possibility of ignition of volatile solvents or other vapors which may be released within the enclosure. The only electrical signals which are developed within the enclosure are themselves confined within housings, which may be constructed with suitable gaskets and other isolating materials to eliminate any possibilities of volatile vapors from coming into contact with electrical circuit components.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An electrically-isolated system for measuring liquid flow rates through a pumping system liquid delivery line, comprising
   a) a mechanical rotating component flow meter interposed in said liquid delivery line;
   b) first electronic circuit means for sensing the rotation of said rotating component and for generating electrical signals representative of said rotation;
   c) second electronic circuit means for receiving said electrical signals representative of said rotation and for converting said electrical signals into corresponding light signals;
   d) a housing sealably enclosing said first and second electronic circuit means, said housing having an air inlet port and an air outlet port and means for accessing said light signals;
   e) an air turbine in said housing in air flow communication with said air inlet port and said air outlet port, and an electrical alternator mechanically connected to said air turbine, and third electronic circuit means in said housing for converting voltages from said electrical alternator into voltages for energizing said first and second electronic circuit means; and
   f) means for delivering a flow of pressurized air to said housing air inlet port, and optical cable means connected to said housing means for accessing said light signals, for transmitting said light signals through said optical cable means.

2. The apparatus of claim 1, wherein said mechanical rotating component flow meter further comprises a pair of intermeshed rotatable gears.

3. The apparatus of claim 2, wherein said first electronic circuit means further comprises a pair of Hall effect sensors located in close proximity to said gears.

4. The apparatus of claim 1, wherein said second electronic circuit means further comprises at least a pair of light-emitting diodes.

5. The apparatus of claim 1, wherein said housing sealably encloses all electrical circuits including said alternator.

6. The apparatus of claim 1, further comprising an enclosure surrounding said pumping system, said enclosure having passages therethrough for said optical cable means, said liquid delivery line, and said means for delivering a flow of pressurized air.

7. The apparatus of claim 1, further comprising a light-emitting diode connected to said alternator.

8. The apparatus of claim 1, wherein said third electronic circuit means further comprises a rectifier circuit connected to said alternator for converting voltages from said alternator to direct current voltages.

9. The apparatus of claim 8, wherein said third electronic circuit means further comprises a voltage regulator connected to said rectifier circuit.

* * * * *